Jan. 2, 1968   E. S. KESSLER   3,361,086
FREIGHT BRACING APPARATUS
Filed Jan. 4, 1966   3 Sheets-Sheet 1
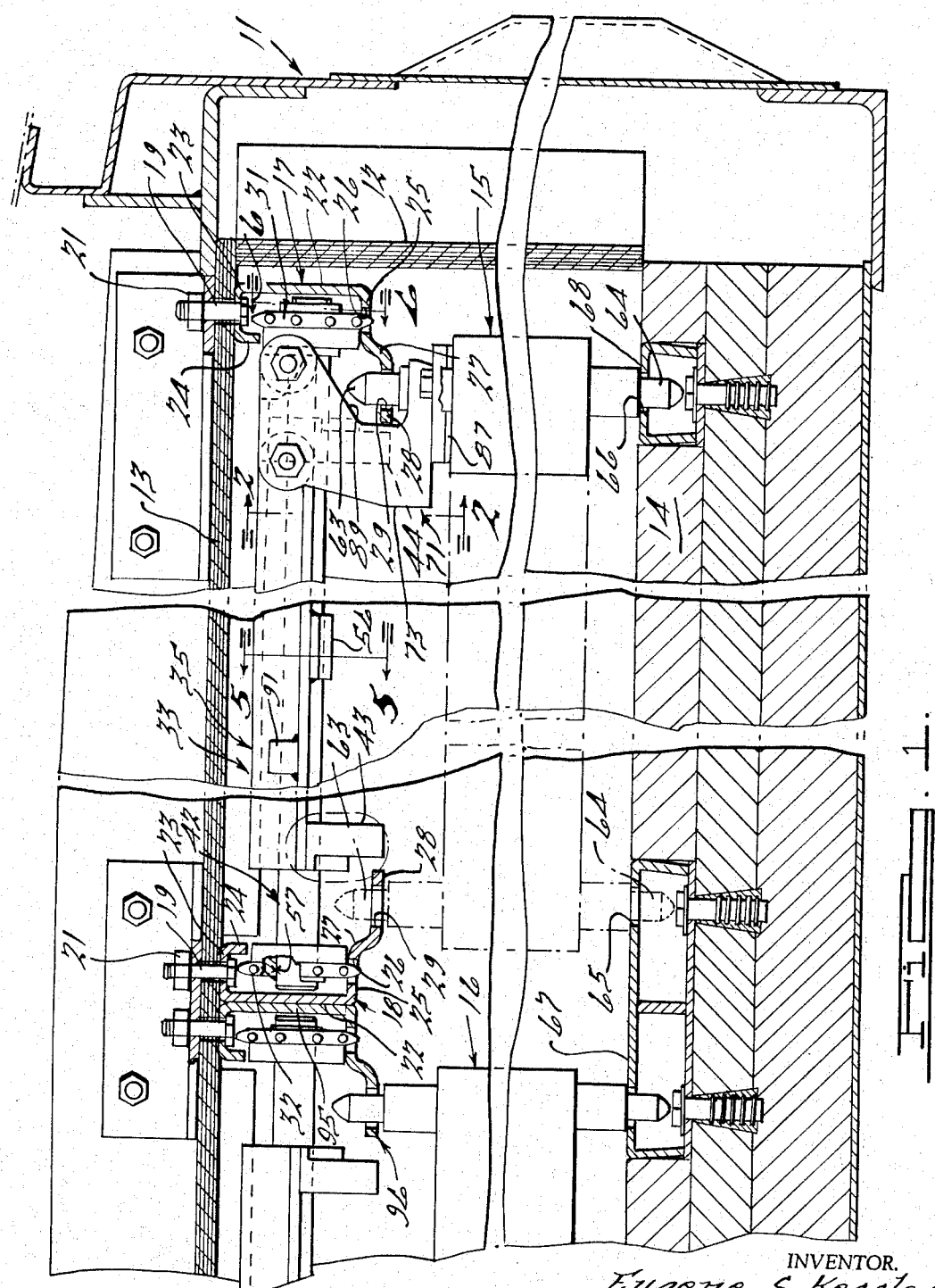
INVENTOR.
Eugene S. Kessler
BY
Harness, Dickey & Pierce
ATTORNEYS.

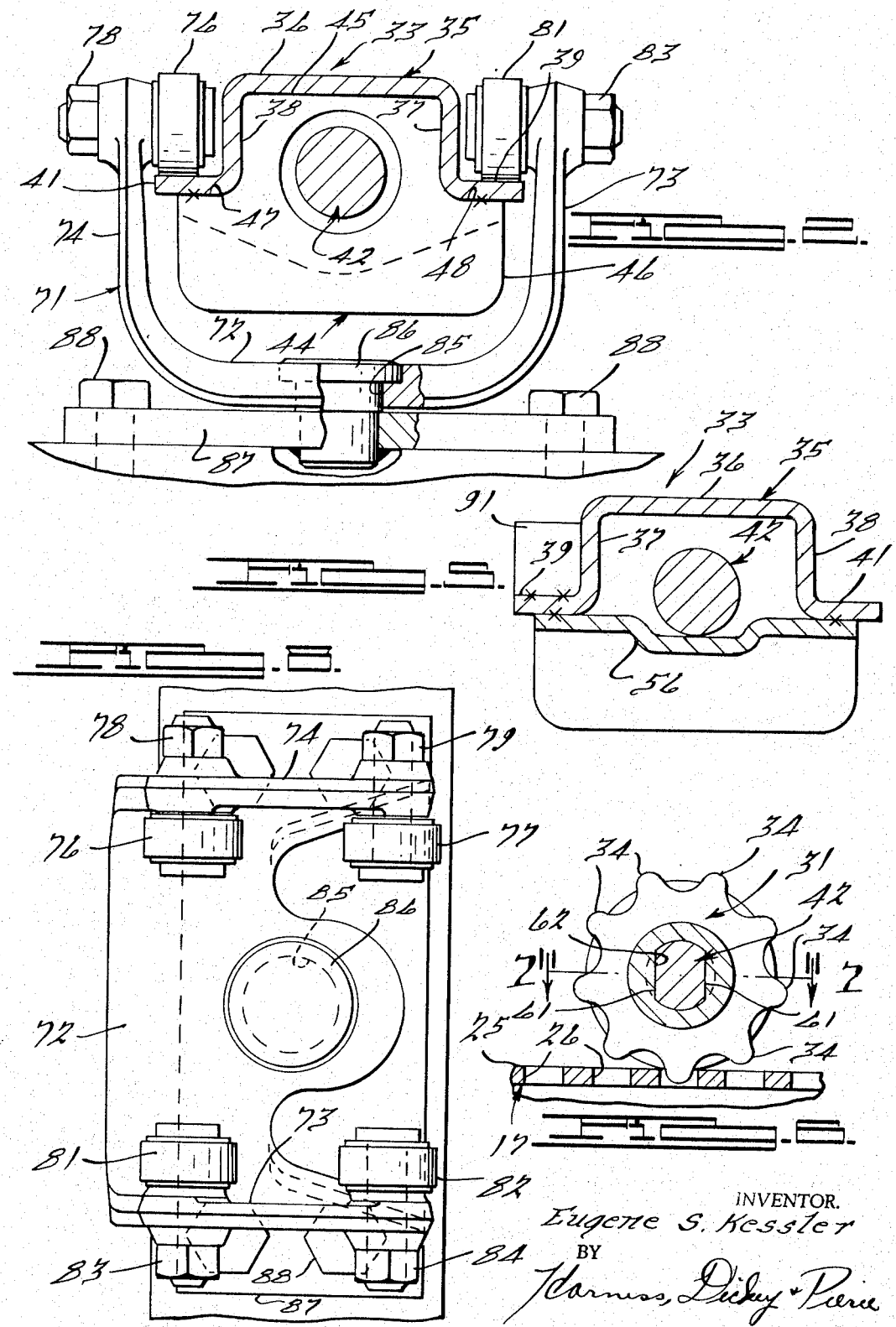

Jan. 2, 1968   E. S. KESSLER   3,361,086
FREIGHT BRACING APPARATUS
Filed Jan. 4, 1966   3 Sheets-Sheet 3
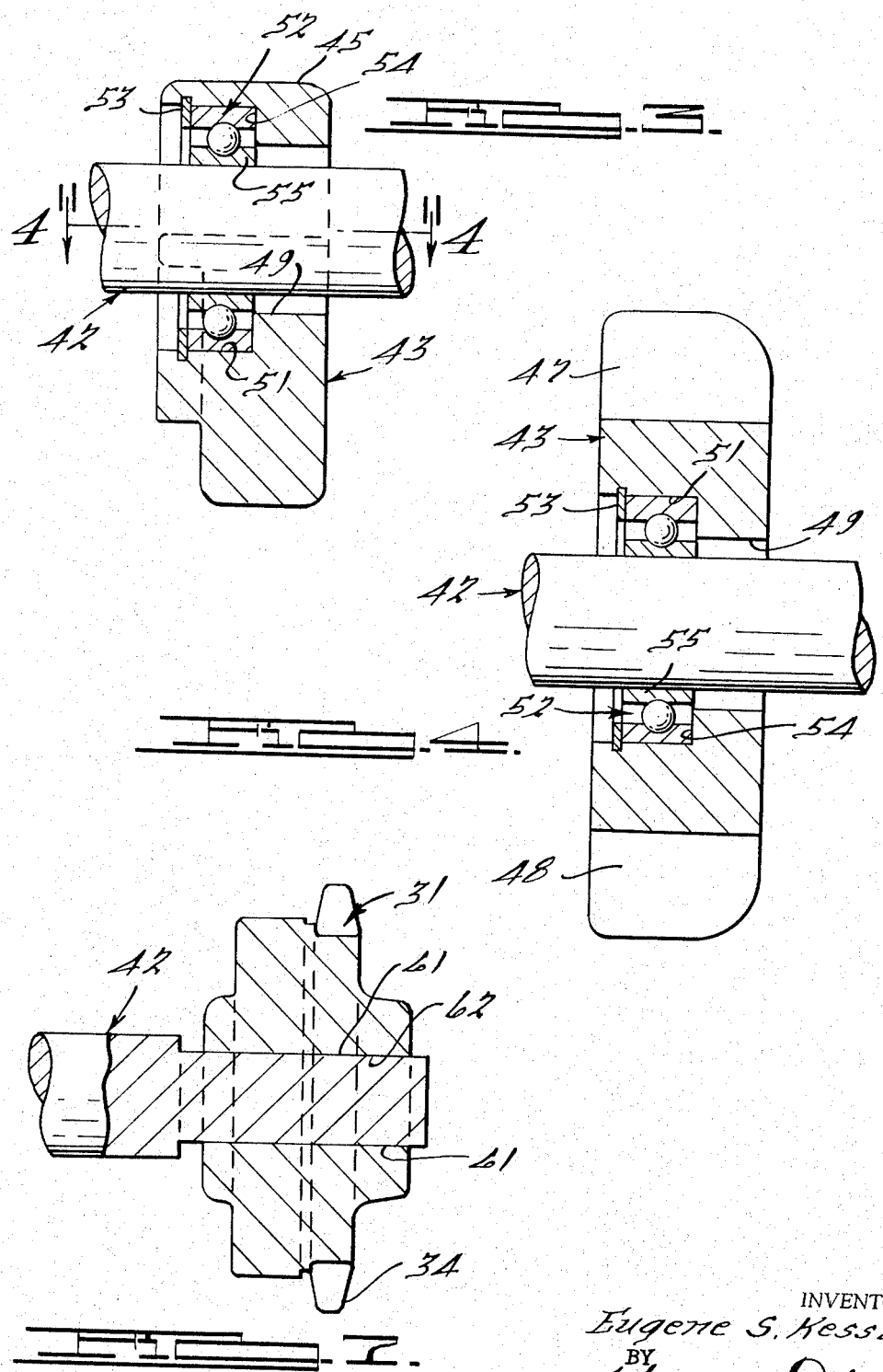
INVENTOR.
Eugene S. Kessler
BY
*Carnes, Dickey & Pierce*
ATTORNEYS.

United States Patent Office 3,361,086
Patented Jan. 2, 1968

3,361,086
FREIGHT BRACING APPARATUS
Eugene S. Kessler, Wayne, Mich., assignor to Evans Products Company, a corporation of Delaware
Filed Jan. 4, 1966, Ser. No. 518,594
2 Claims. (Cl. 105—376)

ABSTRACT OF THE DISCLOSURE

A freight transporting railway boxcar incorporating a pair of freight bracing bulkhead assemblies mounted in side-by-side relationship. Each bulkhead assembly includes an upper, supporting track structure upon which the bulkhead assembly is supported for longitudinal movement along the car by means of a trolley beam structure. The trolley beam and associated suporting structure for the bulkhead permits pivotal movement of the bulkhead so that it may be stored along one side wall of the car.

---

This invention relates to a freight bracing device and more particularly to an improved freight bracing device of the bulkhead type.

The use of a bulkhead assembly for bracing freight in a cargo area, particularly that of a moving freight transporting vehicle such as a railway car, is well known. The bulkhead assembly is normally supported for movement along the length of the cargo area by means of a pair of tracks supported at the upper extremities of the cargo area. A supporting shaft spans these tracks and coacts with them to guide the bulkhead for movement so that the freight bracing position of the bulkhead may be adjusted. The movement of both ends of the supporting shaft should be synchronized with respect to each track so that the shaft will not become dislodged. This is normally accomplished by fastening sprocket wheels either directly or indirectly to the shaft at each of its end so that the movement will be synchronized. Under certain conditions, however, the space between the tracks may vary and some mechanism must be provided to compensate for the variation in spacing without the sprocket wheels becoming dislodged from the tracks.

It is, therefore, an object of this invention to provide an improved supporting shaft construction for supporting a freight bracing bulkhead for movement along a cargo area.

A supporting structure embodying this invention is adapted to suspend a freight bracing bulkhead for movement along a cargo area upon a pair of laterally spaced tracks. The suporting structure comprises shaft means that extend between the tracks and sprocket wheels carried at each end of the shaft means. The sprocket wheels are fixed to the respective ends of the shaft means to preclude relative rotation between the sprocket wheels and the shaft means. At least one of the sprocket wheels is permitted to move axially with respect to the shaft means end to compensate for variations in spacing between the tracks.

The supporting shaft of the type described in the preceding paragraph, as all shafts of this general type, is normally part of a trolley beam structure on which the bulkhead is movably supported. This allows movement of the bulkhead both lengthwise and transversely of the cargo area. The transverse movement is normally provided so that the bulkhead may be stored against one side of the cargo area. The trolley beam structure should not extend so low into the cargo area as to significantly decrease its storage volume, however.

It is, therefore, a still further object of this invention to provide an improved trolley beam structure for supporting a bulkhead.

A trolley beam structure embodying this invention is adapted to support a bulkhead and is comprised of an integral inverted channel shaped beam. A pair of sprocket wheels are suspended at opposite ends of the beam for coaction with the tracks of the cargo area for movement of the beam longitudinally of the area. A bulkhead is suspended from the beam.

As has been previously noted, the bulkhead is normally movable longitudinally and transversely of the car, the transverse movement providing for storage of the bulkhead with respect to a sidewall of the cargo area. To move the bulkhead from its storage position against the wall to its freight bracing position, it is necessary to provide a pivotal connection between the bulkhead and its support.

It is a further object of this invention to provide an improved hanger for supporting a bulkhead and permitting its pivotal movement with respect to the supporting trolley beam.

A hanger accomplishing the objective noted in the preceding paragraph comprises a web having a pair of integrally spaced upstanding arms carrying roller means at their upper ends. The roller means are adapted to engage the track for slidably supporting the hanger therefrom. Means for pivotally suspending the bulkhead are provided within the web.

The tracks for supporting the bulkhead in the previously described type of assembly normally serve a variety of functions. They coact with the sprocket wheels to preclude movement of the sprocket wheels off of the track, they provide a rack-like surface upon which the sprocket wheels rotate and they provide locking pin apertures that are engaged by bulkhead carried locking pins for locking the bulkhead in an adjusted position. The tracks previously used have been built up from a number of structural pieces. This is a relatively expensive construction and on occasions sacrifices strength.

It is, therefore, a still further object of this invention to provide an improved track assembly for supporting a bulkhead.

A track assembly embodying this invention is comprised of an upstanding leg and an outwardly extending leg integrally formed at the lower end of the upstanding leg. A first series of apertures are spaced along the track and defined by the outwardly extending leg contiguous to the upstanding leg for guiding a bulkhead sprocket wheel. A second series of apertures are formed in the outwardly extending leg spaced transversely from the first series of the apetures fo coaction with a bulkhead lockpin to lock a bulkhead in its adjusted position.

The supporting shaft, trolley beam structure, bulkhead hanger and track structure described above are each susceptible of use without the others. These units, however, may be used together to form a vastly improved means for supporting a bulkhead for longitudinal and transverse movement. In a like manner, combinations of two or more of the units may be made combining the advantages of each. This is particularly true with respect to the trolley beam and supporting shaft, which is rotatably supported by the trolley beam.

Other objects and advantages of this invention will become more apparent as this description proceeds, particularly when considered in conjunction with the accompanying drawings, wherein:

FIGURE 1 is a transverse cross-sectional view, with portions broken away, of a railway car embodying this invention;

FIGURE 2 is an enlarged cross-sectional view taken along the line 2—2 of FIGURE 1;

FIGURE 3 is an enlarged cross-sectional view of the encircled area in FIGURE 1;

FIGURE 4 is a cross-sectional view taken along the line 4—4 of FIGURE 3;

FIGURE 5 is an enlarged cross-sectional view taken along the line 5—5 of FIGURE 1;

FIGURE 6 is a cross-sectional view taken along the line 6—6 of FIGURE 1;

FIGURE 7 is an enlarged cross-sectional view taken along the line 7—7 of FIGURE 6; and FIGURE 8 is a top plan view of the trolley hanger assembly.

Referring now in detail to the drawings and in particular to FIGURE 1, a portion of a railway freight car embodying this invention is identified generally by the reference numeral 11 and is shown in transverse cross-section. It is to be understood that, although this invention is described in conjunction with a railway car, its use is not so limited. The invention being susceptible of use in any cargo bracing application or the like. The railway car 11 is made up of an interior sidewall structure 12, roof structure 13 and floor structure 14. In the depicted embodiment two bulkhead assemblies, indicated generally by the reference numerals 15 and 16, are supported within the car 11 between opposite sidewalls. Each of the bulkhead assemblies 15 and 16 is substantially similar and hence only the assembly 15 has been shown completely and will be described in detail.

The bulkhead assembly 15 is supported for movement longitudinally of the car 11 by means of a pair of spaced tracks 17 and 18 that are affixed to the roof structure 13 by means of bolts 19 and nuts 21. The tracks 17 and 18 are identical in construction and are comprised of upstanding legs 22 having an inwardly extending leg 23 integrally formed at their upper ends. The leg 23 abuttingly engages the roof structure 13 and terminates at its inner extremity in a downwardly extending flange, the function of which will become more apparent as this description proceeds. Integrally connected to the upstanding leg 22 at its lower end is an outwardly extending leg 25 in which a plurality of longitudinally spaced apertures 26 are formed. The apertures 26 are formed adjacent the upstanding leg 22 and a downwardly extending section 27 from which an outstanding leg portion 28 extends. The leg portion 28 is parallel to the leg 25 but is positioned slightly below it by the section 27. A plurality of circular apertures 29 are formed in spaced locations along the leg portion 28.

A pair of sprocket wheels 31 and 32 are carried at opposite ends of a bulkhead supporting trolley beam assembly, indicated generally by the reference numeral 33. Each of the sprocket wheels 31 and 32 is formed with sprockets 34 that are adapted to engage the apertures 26 in the tracks 17 and 18 to guide the bulkhead assembly 15 longitudinally of the railway car 11. The sprocket wheels 31 and 32 are slightly different in construction, as will become more apparent as this description proceeds.

The supporting trolley beam assembly 33 is comprised of a generally inverted hat-shaped structural beam 35 having an inverted channel-shaped intermediate portion made up of a web 36 and depending legs 37 and 38. Extending radially outwardly from the lower ends of the legs 37 and 38 are a pair of horizontally extending flanges 39 and 41, respectively.

A sprocket shaft 42 is rotatably journaled within a pair of bearing housing assemblies 43 and 44 shown in more detail in FIGURES 3 and 4. The bearing housing assemblies 43 and 44 are affixed, as by welding at transversely spaced positions contiguous to the ends of the structural beam 35. The bearing housing assemblies 43 and 44 are identical in construction and only the element 43 will be described in detail. The housing assembly 43 is comprised of an upper portion 45 that is complementary in shape to the channel-shaped portion of the structural beam 35 and is received therein. A larger lower section 46 of the bearing assembly has outwardly extending upper shoulders 47 and 48 that abuttingly engage the underside of the flanges 41 and 39.

A small diameter bore 49 and larger diameter bore 51 are formed concentrically with each other within the portions 45 and 46. A ball bearing assembly 52 is retained within the bore 51 between a snap ring 53 and a shoulder 54 formed by the bores 51 and 49. An inner race 55 of the ball bearing assembly 52 engages the outer periphery of the trolley beam shaft 42. Intermediate support for the shaft 42 is provided by means of a bracket 56 (FIGURE 5) that is welded to the lower side of the flanges 39 and 41 at the center of the trolley beam assembly 33.

The sprocket wheel 32 is rigidly affixed, as by a weld 57 (FIGURE 1) to the outer end of the shaft 42. It is essential that the sprocket wheel 31 rotate simultaneously with the sprocket wheel 32 to insure correct timing at each end of the shaft 42 so that the trolley beam assembly 33 will move in a straight direction along the length of the car 11 without binding. Manufacturing variations or shock loadings may cause alteration in the distance between the tracks 17 and 18, however. This variation in spacing is compensated for without the sprocket wheels 31 and 32 becoming disengaged from the apertures 26 by means of the connection between the sprocket wheel 31 and the shaft 42 shown in FIGURES 6 and 7. The shaft 42, which is substantially round for the major portion of its length, is formed with a pair of flats 61. This end is received within a correspondingly shaped aperture 62 formed in the sprocket wheel 31. This in effect keys the sprocket wheel 31 with respect to the shaft 42. The flats 61 have sufficient length, however, so that the sprocket wheel 31 may move axially upon the shaft 42 while continuing to rotate with it. This axial movement is sufficient to compensate for any variations in the spacing between the tracks 17 and 18. The depending flanges 24 of the tracks 17 and 18 further insure that the sprocket wheels 31 and 32 will not become disengaged from the tracks 17 and 18.

The bulkhead assembly 15, which is suspended from the tracks 17 and 18 by means of the trolley beam assembly 33 described, permits the bulkhead assembly 15 to be adjusted in position longitudinally of the car 11. The bulkhead assembly 15 is locked in its adjusted position by means of upper lockpins 63 that engage the apertures 29 formed in the leg parts 28 of the tracks 17 and 18. Lower lockpins 64 engage apertures 65 and 66 formed in lower pin plates 68 and 69 that are affixed to the floor 14. The cooperation of the lockpins 63 and 64 with the respective apertures will retain the bulkhead assembly 15 in position in resistance to force loading thereupon. Preferably the lockpins 63 and 64 are actuated simultaneously by means of any known type of operating linkage.

In addition to being movable longitudinally of the car 11, the bulkhead assemblies 15 and 16 may be rotated about a vertical axis and slid laterally to a storage position adjacent the respective sidewalls of the car 11. In the storage position, the upper lockpins 63 both engage the apertures 29 in the track 17 and the lower lockpins 64 both engage apertures in the pin plate 68. The bulkhead assembly 16 and the dotted line position of the bulkhead assembly 15 in FIGURE 1 illustrate the operative freight bracing position. The solid line view of the bulkhead assembly 15 in FIGURE 1 shows it in its storage position adjacent the sidewall 12. A trolley frame hanger, indicated generally by the reference numeral 71, coacts with the trolley beam assembly 33 to accomplish these movements.

Referring now to FIGURES 2 and 8, the trolley frame hanger assembly 71 includes a casting or the like having a web 72 with integral upstanding arms 73 and 74 formed at opposite sides thereof. The arm 74 supports a pair of spaced rollers 76 and 77, that are affixed for rotation relative to the arm 74 in any suitable manner, as by nuts 78 and 79. The rollers 76 and 77 engage the upper surface of the trolley beam flange 41. In a like manner, a pair of rollers 81 and 82 are fixed to the upstanding arm 73 by means of nuts 83 and 84. The rollers 81 and 82 engage the upper side of the flange 39 so that the hanger assembly 71 can roll transversely of the car 11 upon the trolley beam assembly 33.

A stepped bore 85 forms a bearing portion in the hanger web 72 to receive a headed pivot pin 86 and rotatably support it with respect to the remainder of the hanger assembly 71. The bore 85 and pivot pin 86 are positioned substantially in the middle of the axes of rotation of the rollers 76 and 81 and 77 and 82. This resists any tipping tendency. The lower end of the pivot pin 86 is affixed, as by welding, to a plate 87 which is in turn affixed, as by bolts 88, to the bulkhead assembly 15.

It should be readily apparent that the bulkhead assembly 15 may be pivoted through at least 90° with respect to the trolley beam hanger assembly 71 by rotating the pivot pin 86 within the bearing portion 85. When in its storage position, the trolley beam hanger assembly 71 is slid along the trolley beam assembly 33 to the adjacent side of the car. A cutout portion 89 is formed in each of the legs 73 and 74 so as to preclude any interference with the track leg portion 28. It will be noted that this cutout permits the pivot pin 86 and pivotal axis of the bulkhead assembly 15 to be located substantially on the center of the web portion 72 half way between the center lines of rotation of the rollers 76, 81 and 77, 82.

To move the bulkhead assembly 15 from its storage position as shown in the solid line view to its operative position as shown in the dotted line view, the trolley hanger assembly 71 is rolled along the trolley beam assembly 33 until the arm 73 strikes a stop 91 that is affixed to the trolley beam 35 between the leg 37 and flange 39. The stop 91 assures that the bulkhead assembly 15 will be centered between the tracks 17 and 18 before it is rotated to its freight bracing position, thus precluding any interference.

It will be noted that two bulkhead assemblies 15 and 16 span the width of the railway car 11. Although the inventive features disclosed herein may be used with a single bulkhead assembly, the track structure disclosed particularly lends itself to two piece bulkhead design. The upstanding leg 22 of the track 18, mounted at the center of the car, is positioned in abutting relationship with an upstanding leg 95 of a track 96 which cooperates with the bulkhead assembly 16. The track 96 is identical in construction of the tracks 17 and 18.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A freight bracing bulkhead assembly adapted to be supported for movement along the length of a freight bracing vehicle on a pair of spaced tracks, said bulkhead assembly comprising a trolley beam assembly, said trolley beam assembly comprising an elongated integral inverted channel shaped beam having a web portion, depending legs and oppositely facing horizontally extending flanges formed integrally at the lower ends of the respective of said legs, bearing means carried by said beam at the opposite ends thereof between said legs, a trolley beam shaft extending along said trolley beam and projecting beyond the ends thereof, said trolley beam shaft being rotatably supported in said bearing means, sprocket wheels affixed against rotation with respect to the opposite ends of said trolley beam shaft, at least one of said sprocket wheels being supported for axial movement along said trolley beam shaft and supporting means affixed to said flanges intermediate the ends of said beam for supporting the intermediate portion of said trolley shaft, carriage means carrying spaced roller means engaged with the respective of said flanges for transverse movement of said carriage means along said trolley beam assembly, and means for pivotally supporting said bulkhead upon said carriage means.

2. An integral track for supporting a bulkhead for movement along a cargo area comprising an upstanding leg, a first outwardly extending leg integrally formed at the lower end of said upstanding leg, said first outwardly extending leg being comprised of a first portion adjacent said upstanding leg and in which a first series of longitudinally spaced apertures are formed for coaction with a sprocket wheel of the bulkhead, and a second portion connected to said first portion by a downwardly extending segment whereby said second portion is positioned below said first portion, a second series of longitudinally spaced apertures formed in said second portion for the receipt of locking pins carried by the bulkhead, a second outwardly extending leg integrally formed at the upper end of said supporting leg, said second outwardly extending leg being of substantially the same length as said first portion of said first outwardly leg and positioned thereabove, and a depending flange formed integrally at the outer end of said second outwardly extending leg for retaining a sprocket wheel within said track.

References Cited
UNITED STATES PATENTS

| | | | |
|---|---|---|---|
| 2,752,864 | 7/1956 | McDougal et al. | 105—376 |
| 2,752,865 | 7/1956 | Candlin | 105—414 |
| 2,842,070 | 7/1958 | Boese et al. | 105—414 |
| 3,017,842 | 1/1962 | Nampa | 105—376 |
| 3,168,055 | 2/1965 | Vander Hyde et al. | 105—376 |
| 3,200,773 | 8/1965 | Moorehead | 105—376 |
| 3,209,707 | 10/1965 | Erickson et al. | 105—376 |
| 3,217,664 | 11/1965 | Aquino et al. | 105—376 |
| 3,241,502 | 3/1966 | Magarian et al. | 105—376 |

ARTHUR L. LA POINT, *Primary Examiner.*

E. HOFFMAN, *Assistant Examiner.*